Sept. 15, 1925.  
C. A. BODDIE  
1,553,359

LOAD REGULATOR SYSTEM

Filed Aug. 26, 1919  2 Sheets-Sheet 1

WITNESSES:  
J. A. Helsel  
W. B. Wells

INVENTOR  
Clarence A. Boddie.  
BY  
Wesley Carr  
ATTORNEY

Sept. 15, 1925.  
C. A. BODDIE  
LOAD REGULATOR SYSTEM  
Filed Aug. 26, 1919  
1,553,359  
2 Sheets-Sheet 2

WITNESSES:  
J. A. Helsel  
W. B. Wells

INVENTOR  
Clarence A. Boddie.  
BY  
Wesley L. Carr  
ATTORNEY

Patented Sept. 15, 1925.

1,553,359

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

LOAD-REGULATOR SYSTEM.

Application filed August 26, 1919. Serial No. 319,910.

To all whom it may concern:

Be it known that I, CLARENCE A. BODDIE, a citizen of the United States, and a resident of Pittsburgh, in the county of Allegheny and State of Pennsylvania, have invented a new and useful Improvement in Load-Regulator Systems, of which the following is a specification.

My invention relates to regulator systems and particularly to regulator systems for governing the loads maintained on electric generators.

One object of my invention is to provide a load-regulator system that shall be operated in accordance with the power supplied by a main source of supply for governing the output of an auxiliary source of supply to maintain a substantially-constant load on the main source of supply and that shall be subjected to a reactionary force in accordance with the operation of the auxiliary source of supply to prevent hunting action.

In operating many large electrical distributing systems, it is very often desirable to maintain a substantially-constant load on a main source of supply and to have all peak loads taken care of by an auxiliary source of supply. Accordingly, load-regulator systems have been provided for controlling the load on the auxiliary source in accordance with the load on the main source in order to maintain a substantially-constant load on the main source. However, such load-regulator systems have been somewhat impractical in operation, inasmuch as no means has been provided for preventing the so-called hunting action.

In practicing my invention, a supply circuit is provided with a main source of supply and an auxiliary generator which is governed in accordance with the load on the main source to take care of all peak loads. The regulating means for controlling the operation of the auxiliary generator comprises a main control element, which is operated directly in accordance with the power supplied by the main source, and means controlled by the main element for operating the prime mover, which is connected to the auxiliary generator, to maintain a substantially-constant load on the main source of supply. Moreover, means is operated in accordance with the operation of the auxiliary generator for reacting upon the main control element to prevent hunting action.

Figure 1:
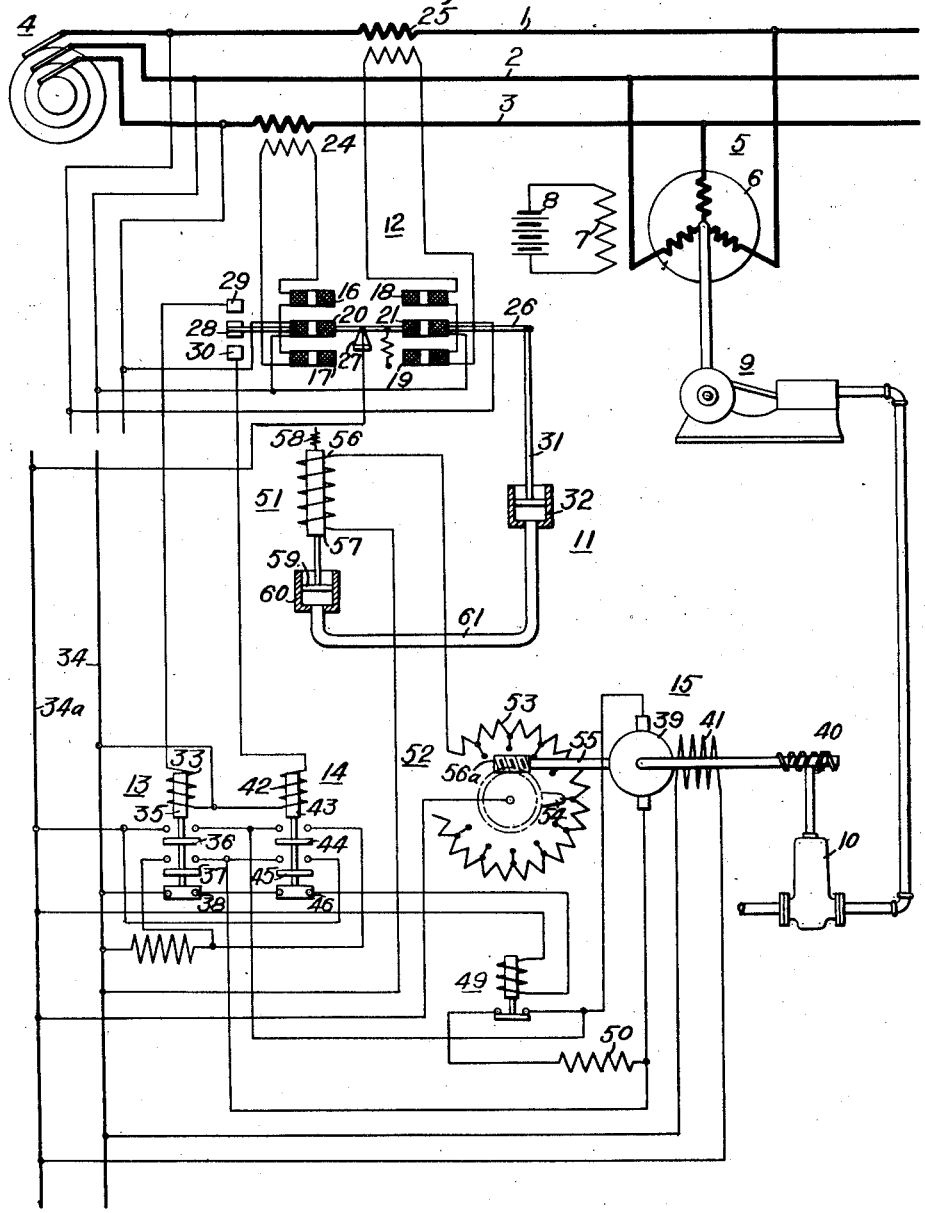
Figure 2:
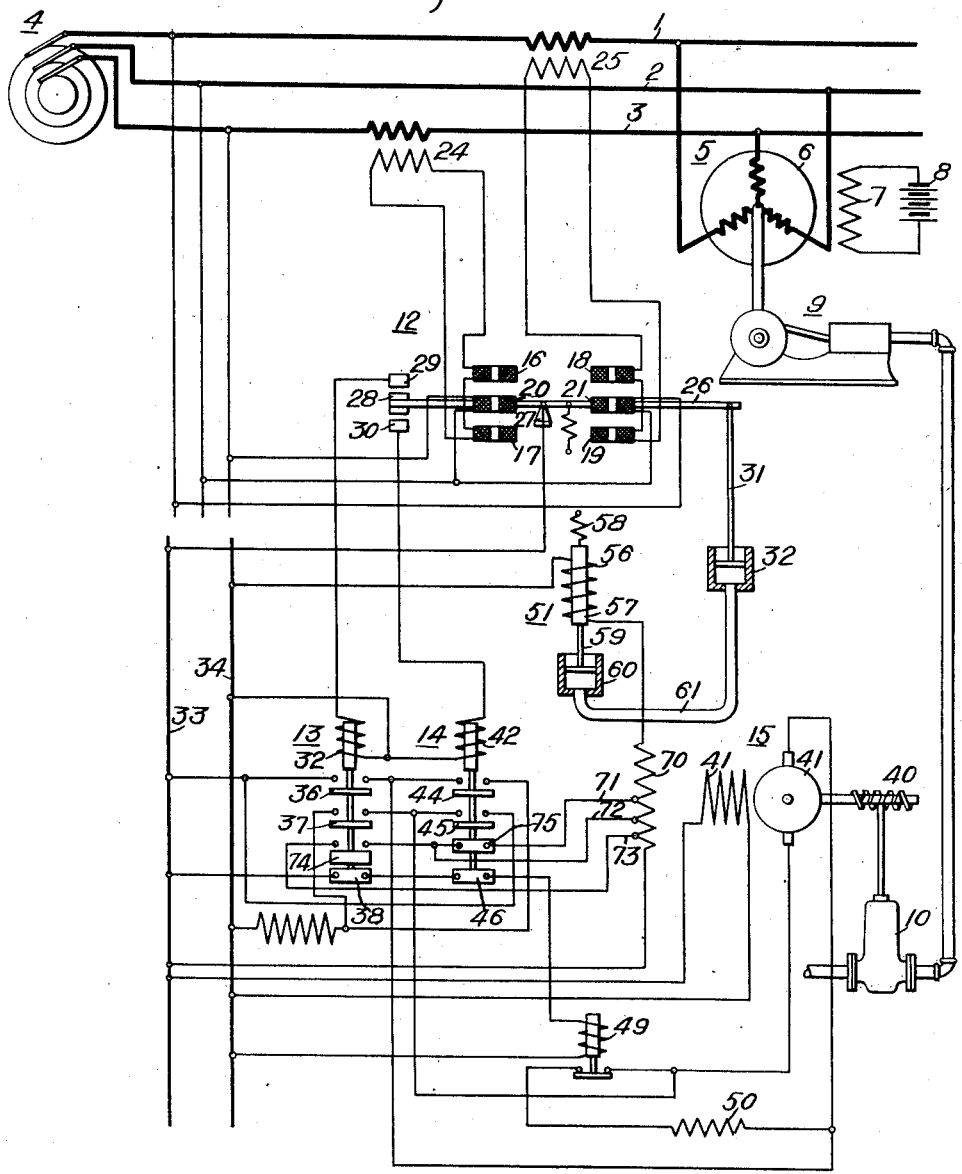

In the accompanying drawings, Figure 1 is a diagrammatic view of a regular system embodying my invention, and Fig. 2 is a diagrammatic view of a modification of my invention.

Referring to Fig. 1 of the drawing, a supply circuit, comprising conductors 1, 2 and 3, is provided with a main source of supply comprising a generator 4 and an auxiliary source of supply comprising an auxiliary generator 5. The auxiliary generator 5 embodies a rotor 6 and a field winding 7 which is energized from any suitable source, such as a battery 8. The auxiliary generator 5 is operated by any suitable means such, for example, as a steam engine 9 or any other suitable prime mover, and the steam engine 9 is preferably controlled by means of a throttle valve 10.

A regulator 11, comprising a main control element 12, two switches 13 and 14 and a motor 15, is provided for controlling the steam engine 9 and the auxiliary generator 5 to maintain a substantially-constant load on the main generator 4. The main control element 12 is illustrated in the form of a Kelvin balance and comprises four stationary coils 16, 17, 18 and 19 and two movable coils 20 and 21. The stationary coils 16 to 19, inclusive, are energized in accordance with the current flowing through the supply circuit and are connected to the supply circuit by means of transformers 24 and 25. The movable coil 20 is connected across the supply conductors 1 and 2, and the movable coil 21 is connected across the supply conductors 2 and 3. A contact arm 26 is fulcrumed at 27 and carries the two movable coils 20 and 21 and a main contact member 28 which engages stationary contact members 29 and 30 according to the energization of the coils of the Kelvin balance. A piston 31, which operates within a cylinder 32, is pivotally connected to the contact arm 26 and serves to change the operation of the Kelvin balance, in a manner to be hereinafter set forth, for preventing hunting action by the load regulator.

The switch 13 comprises an energizing winding 33 which is connected across an auxiliary supply circuit comprising conductors 34 and 34a upon engagement between the contact members 28 and 29. A core armature 35, which is controlled by the winding 33, operates two switch members 36 and 37 and an auxiliary switch member 38. The two switch members 36 and 37 serve to connect the armature 39 of the motor 15 across the supply conductors 34a and 34 to effect rotation of the motor in a counter-clockwise direction. The motor 15 is connected to the throttle valve 10 by any suitable gearing 40 and, when rotated in a counter-clockwise direction, closes the valve 10 to reduce the load taken by the auxiliary generator 5. A field winding 41 of the motor 15 is directly connected across the supply conductors 34a and 34.

The switch 14 comprises a winding 42, which is connected across the supply conductors 34a and 34 upon engagement between the contact members 28 and 30, and a core armature 43 which operates two switch members 44 and 45 and an interlock switch member 46. The two switch members 44 and 45 connect the armature 39 across the supply conductors 34a and 34 for operating the motor 15 in a clockwise direction to open the valve 10 and increase the amount of the load taken by the auxiliary generator 5. The two interlock switch members 38 and 46, upon release of the switches 13 and 14, serve to complete an energizing circuit for a brake relay 49 from the supply conductors 34a and 34. The brake relay 49 completes a dynamic-braking circuit through a resistor 50 for the armature 39 in order to effect a quick stopping of the motor 15.

The motor 15 not only controls the operation of the steam engine 9 by the throttle valve 10 but also governs the operation of an auxiliary magnet 51 by means of a rheostat 52. The rheostat 52 comprises a resistor 53, the active portion of which is varied by means of a rotatable contact arm 54. The contact arm 54 is connected to the armature shaft 55 by means of any suitable gearing 56a. The auxiliary magnet 51 comprises a winding 56 which is connected in series with the rheostat 52 across the supply conductors 34a and 34 and a core armature 57 which is maintained in a biased position by means of a spring member 58. The core armature 57 is provided with a piston 59 which operates within a cylinder 60. The cylinder 60 is connected to the cylinder 32 by means of a tube 61 containing any suitable fluid, in order that any operation of the auxiliary magnet 51 may produce a corresponding effect upon the contact arm 26 of the Kelvin balance 12. Thus, it is apparent that the motor 15 operates the rheostat 52 concurrently with the operation of the steam engine 9 for varying the operation of the auxiliary magnet 51 to change the setting of the main control element or Kelvin balance.

In case the load upon the supply circuit, comprising conductors 1, 2 and 3, and the load upon the main generator 4 is above normal value, the Kelvin balance 12 is operated to effect engagement between the main contact members 28 and 30. Thereupon, the switch 14 is operated to effect rotation of the motor 15 in a clockwise direction. The motor 15 opens the throttle valve 10 to increase the steam consumption of the engine 9 and, accordingly, to increase the percent of the load on the supply conductors 1, 2 and 3, which is taken by the auxiliary generator 5.

In case the Kelvin balance 12 were controlled solely in accordance with the load upon the main generator 4, the contact arm 26 would not be operated to effect separation of the contact members 28 and 30 until the main generator carried a normal load. Consequently, the moving parts of the regulator and of the motor 15 would overtravel to over-compensate the auxiliary generator 5 and, accordingly, to reduce the load carried by the main generator 4 below a normal amount. In order to prevent such overtravel and the consequent hunting action, the setting of the Kelvin balance is temporarily changed by the auxiliary magnet 51 to effect separation of the main contact members 28 and 30 just prior to the obtaining of normal load conditions on the main generator 4. Thus, the clockwise rotation of the motor 15 increases the resistance value of the rheostat 52 which is included in circuit with the auxiliary-magnet winding 56. The energization of the auxiliary magnet is reduced and, consequently, the piston 59 is raised to lower the pressure which is exerted upon the piston 31. Accordingly, the force tending to maintain the contact members 28 and 30 in engagement with each other is reduced so that separation of these contact members is effected just prior to the obtaining of normal load conditions on the main generator 4.

If the load carried by the main generator 4 is below normal value, the Kelvin balance or main control element 12 is operated to effect engagement between the contact members 28 and 29. Thereupon, the switch 13 is operated for connecting the armature 39 across the supply conductors 34a and 34 to effect rotation of the motor 15 in a counter-clockwise direction. The counter-clockwise rotation of the motor 15 closes the valve 10 to decrease the per cent of the load which is taken by the auxiliary generator 5 and, accordingly, to increase the load on the main generator 4 to normal value.

In order to prevent hunting action, the counter-clockwise rotation of the motor decreases the resistance value of the rheostat 52 which is included in circuit with the winding 56 of the auxiliary magnet. Accordingly, the energization of the auxiliary magnet is increased to lower the piston 59 and, consequently, to increase the pressure which is exerted upon the lower portion of the piston 31. Therefore, the force tending to maintain the contact members 28 and 29 in engagement with each other is so reduced that separation of the contact members 28 and 29 is effected just prior to the obtaining of normal load conditions upon the main generator 4.

Inasmuch as the system disclosed in Fig. 2 of the drawings is similar in construction and operation to the system disclosed in Fig. 1, and differs solely in the means for energizing the auxiliary magnet to prevent any hunting action, like parts have been indicated by corresponding reference numerals. In the system disclosed in Fig. 2 of the drawings, the winding 56 of the auxiliary magnet 51 is connected, in series with a resistor 70, across the supply conductors 34a and 34. The resistor 70 is provided with three taps 71, 72 and 73 which are controlled by two interlock switches 74 and 75, respectively associated with the switches 13 and 14, for varying the energization of the auxiliary magnet 51 to prevent hunting action.

Inasmuch as the system disclosed in Fig. 2 operates substantially the same as the system disclosed in Fig. 1, with the exception of the means for preventing hunting action, it has been deemed sufficient to describe only the anti-hunting means of the system in detail. In case the Kelvin balance 12 is operated to effect engagement between the contact members 28 and 29 for increasing the amount of power supplied by the main generator 4, the switch 13 is operated to effect counter-clockwise rotation of the motor 15 for decreasing the amount of power supplied by the auxiliary generator 5. The switch 13 not only effects counter-clockwise rotation of the motor 15 but also operates the interlock switch member 74 to short-circuit that portion of the resistor 70 which is included between the taps 72 and 73. Consequently, the energization of the auxiliary magnet 51 is increased to lower the piston 59 and increase the pressure which is exerted upon the bottom of the piston 31. Accordingly, the position of the Kelvin balance 12 is changed to effect separation of the main contact members 28 and 29 just prior to the obtaining of normal load conditions upon the generator 4.

In case the Kelvin balance 12 is operated to effect engagement between the contact members 28 and 30 for increasing the load upon the auxiliary generator 5, the switch 14 is operated to effect rotation of the motor 15 in a counter-clockwise direction. The counter-clockwise rotation of the motor 15 opens the valve 10 to increase the per cent of load which is taken by the engine 9 and the generator 5 and, accordingly, to decrease the load upon the main generator 4 to normal value.

The switch 14 not only controls the motor 15 but also operates an interlock switch member 75 for opening a short-circuit which normally obtains across that portion of the resistor 70 which is included between the taps 71 and 72. Accordingly, the energization of the auxiliary magnet 15 is reduced to raise the piston 59. Consequently, the pressure exerted upon the bottom of the piston 31 is reduced to change the position of the Kelvin balance 12 and permit the separation of the contact members 28 and 30 just prior to the obtaining of normal load conditions upon the main generator 4.

Modifications in the system and arrangement and location of parts may be made within the spirit and scope of my invention and such modifications are intended to be covered by the appended claims.

I claim as my invention:

1. In a load-regulator system, the combination with a supply circuit, a main source of supply and an auxiliary generator connected to said circuit, and a prime mover for actuating said auxiliary generator, of a main control element operated in accordance with the power delivered by the main source, means comprising a motor controlled by said element for governing said prime mover to maintain the load on the main source constant, a rheostat operated by said motor and means comprising an auxiliary magnet governed by said rheostat for varying the operation of the main control element to prevent hunting action.

2. In a load-regulator system, the combination with a main and an auxiliary source of supply, of means controlled by the main source for increasing and decreasing the load on the auxiliary source to maintain a constant load on the main source, and means operated in accordance with the variation in load on the auxiliary source for reacting on said first means to prevent hunting action.

In testimony whereof, I have hereunto subscribed my name this 12th day of Aug. 1919.

CLARENCE A. BODDIE.